US008301505B2

(12) United States Patent
Farouki et al.

(10) Patent No.: US 8,301,505 B2
(45) Date of Patent: Oct. 30, 2012

(54) INTEGRATED CONTENT VIEWING AND PAYMENT

(75) Inventors: Karim Taji Farouki, Seattle, WA (US); Blaise Hilary Aguera y Arcas, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1078 days.

(21) Appl. No.: 11/653,581

(22) Filed: Jan. 16, 2007

(65) Prior Publication Data

US 2008/0172315 A1    Jul. 17, 2008

(51) Int. Cl.
*G06Q 30/00* (2012.01)
*G06Q 10/00* (2012.01)

(52) U.S. Cl. ........................................ 705/26.1; 705/1.1
(58) Field of Classification Search ........................ None
See application file for complete search history.

(56) References Cited

U.S. PATENT DOCUMENTS

| | | | |
|---|---|---|---|
| 5,666,215 A * | 9/1997 | Fredlund et al. | 358/487 |
| 5,825,876 A | 10/1998 | Peterson, Jr. | |
| 6,396,962 B1 * | 5/2002 | Haffey et al. | 382/298 |
| 6,577,311 B1 * | 6/2003 | Crosby et al. | 345/428 |
| 6,600,495 B1 * | 7/2003 | Boland et al. | 345/660 |
| 6,714,692 B1 * | 3/2004 | Kim et al. | 382/299 |
| 6,760,128 B2 | 7/2004 | Jackson et al. | |
| 6,836,617 B1 | 12/2004 | Parulski | |
| 6,978,049 B2 | 12/2005 | Chui et al. | |
| 7,013,288 B1 * | 3/2006 | Reifel et al. | 705/26 |
| 7,051,019 B1 | 5/2006 | Land et al. | |
| 7,403,912 B2 * | 7/2008 | Rivera et al. | 705/26 |
| 7,502,036 B2 * | 3/2009 | Kramer et al. | 345/629 |
| 7,574,378 B2 * | 8/2009 | Lipowitz et al. | 705/26 |
| 7,697,040 B2 * | 4/2010 | Sorensen et al. | 348/231.2 |
| 2002/0159647 A1 * | 10/2002 | Blosser | 382/255 |
| 2003/0167469 A1 * | 9/2003 | Hardingham et al. | 725/61 |
| 2005/0174430 A1 | 8/2005 | Anderson | |
| 2005/0187829 A1 | 8/2005 | Doll-Steinberg | |
| 2006/0044599 A1 | 3/2006 | Lipowitz et al. | |

FOREIGN PATENT DOCUMENTS

WO    WO2005120163 A2    12/2005

OTHER PUBLICATIONS

Anonymous, VladStudio—vladstudio.com as provided by Internet Archive, rendered on Dec. 2005-Mar. 2006.*
"Copyright notice and Terms of Use", http://www.terragalleria.com/copyright.html.
"Pay Per Download", http://www.ablestock.com/en/company/ppd.
Varian, Hal R., "Market Structure in the Network Age", Date: 1999, http://www.ischool.berkeley.edu/~hal/Papers/doc/doc.html#Shapiro98.
"Copyright notice and Terms of Use", downloaded Nov. 6, 2006 from http://www.terragalleria.com/copyright.html 4 pages.
"Pay Per Download", downloaded Nov. 6, 2006 from http://www.ablestock.com/en/company/ppd, 2 pages.

* cited by examiner

*Primary Examiner* — Asfand Sheikh
(74) *Attorney, Agent, or Firm* — Hope Baldauff Hartman, LLC

(57) ABSTRACT

A content purchaser can freely and fluidly zoom into and out of content at a continuous range of resolutions. The price for the viewed content is calculated using a price function, such as a binary price function, a discrete price function, or a continuous price function. Payment can be made automatically without interrupting the process of viewing the content. If payment cannot be made automatically, various user interfaces may be provided that are integrated with the viewing process for allowing a would-be purchaser to buy the content at any desired resolution.

20 Claims, 13 Drawing Sheets

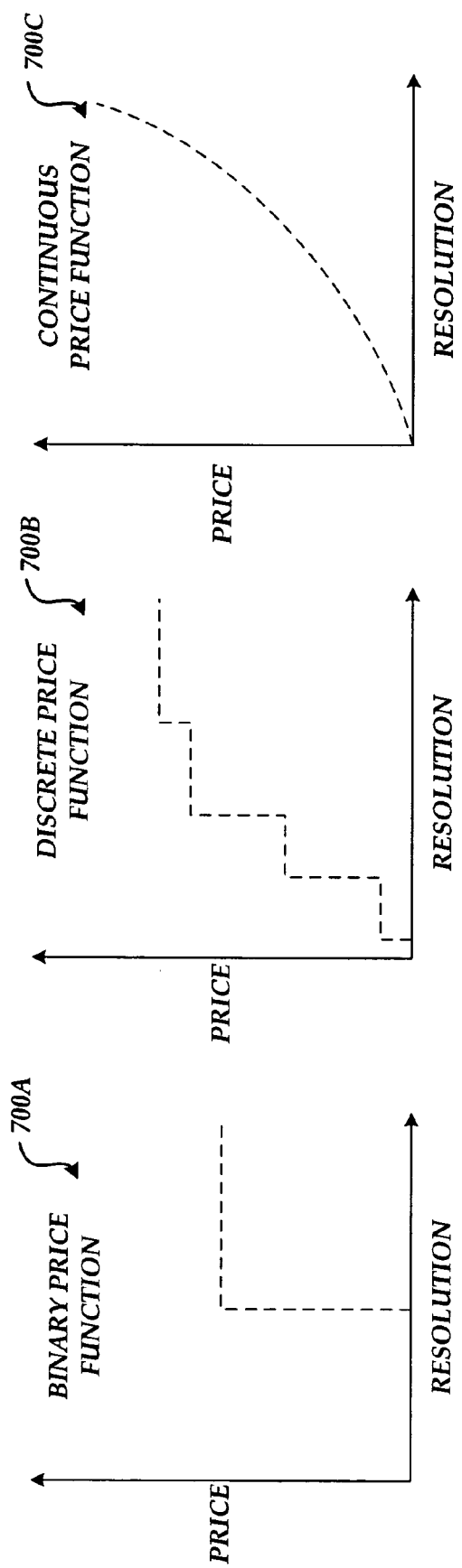

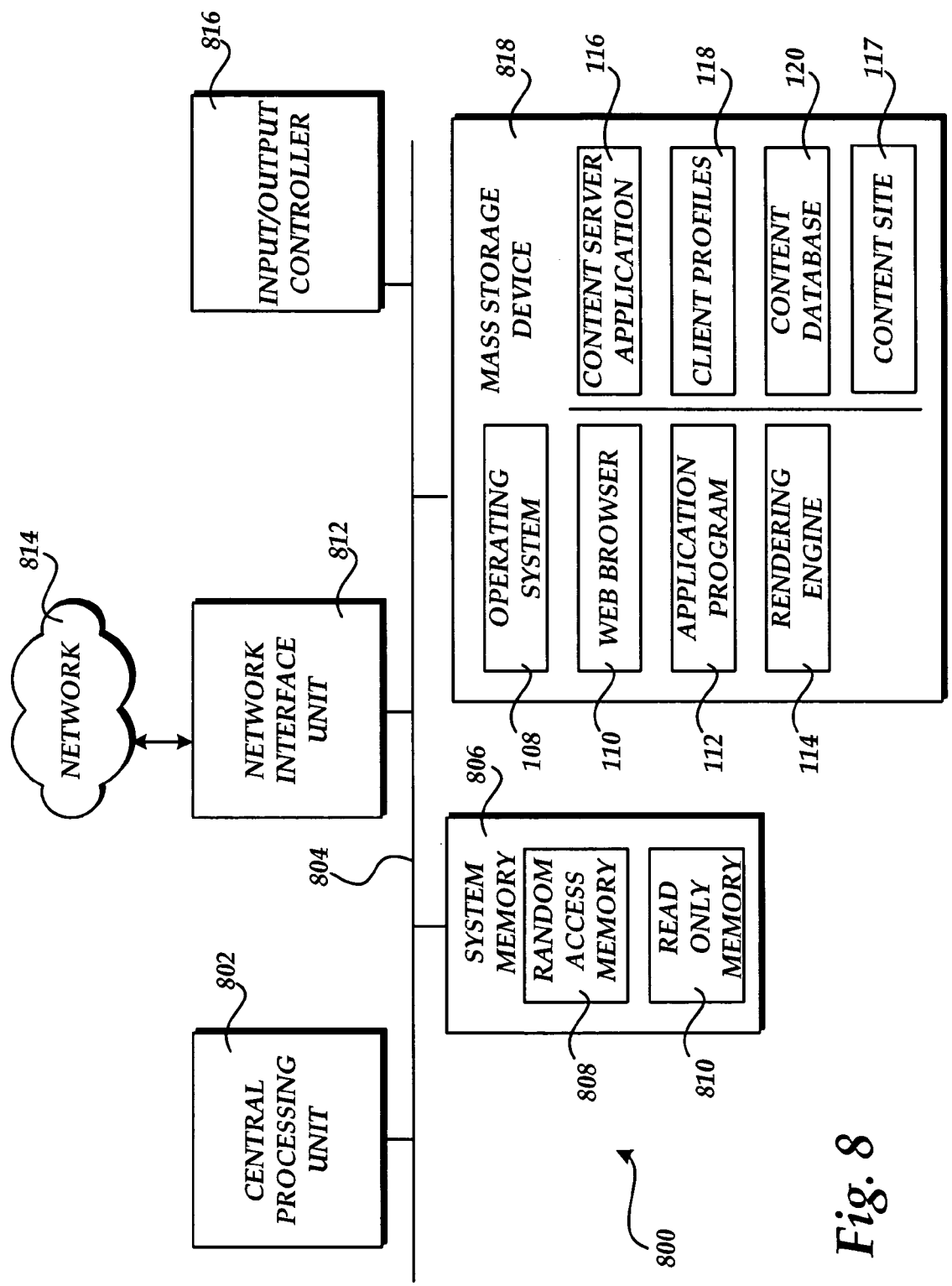

INTEGRATED CONTENT VIEWING AND PAYMENT

BACKGROUND

As high-speed connections to the Internet become more ubiquitous and bandwidth increases, the Internet is emerging as a strong marketplace for the purchase and sale of content. Through various mechanisms, users can sample, browse, and purchase content over the Internet. For instance, through a World Wide Web ("Web") site, a user may be able to purchase visual content, like still digital pictures or movies.

The current mechanisms for sampling, browsing, and ultimately paying for content via the Internet are still in their infancy. These mechanisms typically allow nothing more than the viewing of a low-resolution placeholder for a full-resolution picture or movie, called a "thumbnail." The full-resolution picture or movie can only be viewed after the user has purchased it. Moreover, only the low-resolution and full-resolution versions of a picture or movie are made available. There is generally no provision made for obtaining a version of the picture or movie at other resolutions.

The current mechanisms for sampling, browsing, and paying for content via the Internet also provide a disjointed consumer experience. In particular, utilizing current systems, a user is forced to browse low-resolution thumbnails of pictures or low-resolution previews of movies available for purchase. Because the user can only view the low-resolution version of the content, it may be difficult for the user to determine if the content will meet their particular needs. For instance, a newspaper editor may require a picture that meets certain standards regarding quality, sharpness, saturation, contrast, color temperature, and others. It can be difficult to determine whether content meets these types of standards by viewing only a low-resolution thumbnail.

If the user decides to purchase an image or movie using current systems, the user is typically shown one or more display screens through which they can provide contact and payment information. Only when this information has been provided is the user authorized to download the high-resolution version of the content. The user can then finally view the purchased content after the download has completed. A checkout and payment process that is separate from the content browsing experience such as this interrupts content browsing with a highly intrusive payment process. This can be frustrating and inefficient for a user interested in obtaining the desired content as quickly and efficiently as possible.

It is with respect to these considerations and others that the disclosure made herein is provided.

SUMMARY

Technologies are provided herein for integrating content viewing with a process for paying for the viewed content. Through aspects described herein, a content purchaser can freely and fluidly zoom into and out of content at a continuous range of resolutions. The price for the viewed content increases, either discretely or continuously, as the resolution of the content increases. Payment can be made for the viewed content without interrupting the viewing process.

According to one aspect presented herein, a method for integrating content viewing with a process for paying for viewed content is provided. According to the method, content is offered for viewing at a continuous range of resolutions. For instance, in one implementation, adaptive rendering is utilized to allow a user to fluidly and freely zoom into and out of the content at a continuous range of resolutions. As used herein, the term content refers to visual content, such as still images, moving images, and text.

When a request is received to view content at a particular resolution, a price is calculated for the content at the requested resolution. A charge is then made for the provision of the content at the requested resolution without interrupting the viewing of the content. According to aspects, the price for the content at the requested resolution may be computed using a price function. I1317886.01n one implementation, a continuous price function is utilized that varies the price of the content as a continuous function of resolution. In this case, the price function may be linear, logarithmic, exponential, or any other type of continuous function.

In another implementation, a discrete price function is utilized to calculate the price for the content at the desired resolution. A discrete price function utilizes any number of discrete price levels for the content. For instance, a binary price function is one type of discrete price function that specifies two price levels for the content. For instance, a binary price function may be specified that provides the content for free up to a specified resolution. A charge is made, however, for provision of the content at any resolution higher than the specified resolution.

According to other aspects of the method, a determination may be made prior to providing the content at the requested resolution as to whether a client computer that has requested the content is authorized to receive the content. For instance, in one implementation this determination is made based upon whether an account exists to which the charge for provision of the content at the requested resolution may be made. If an account does exist, a charge for the provision of the content at the requested resolution is made to the account without interrupting the viewing of the content. If an account does not exist, an attempt is made to sell the content at the requested resolution to a user of the client computer, while disrupting the content viewing process as minimally as possible.

Several different methods may be utilized to sell the content at the requested resolution to the user while disrupting the content view process as minimally as possible. For instance, according to one implementation, when the client computer is not authorized to receive the content at the requested resolution, the content may be provided to the client computer at a resolution that is lower than the requested resolution. In the case of a still image, continued zooming into the provided content causes pixelation, thereby indicating to the would-be purchaser that payment must be made in order to receive a higher resolution version of the image. An icon or other type of user interface control may also be displayed adjacent to the content to indicate that payment must be made in order to receive a higher resolution version of the content. Selection of the icon initiates a process whereby an account may be created and payment information received for the content.

According to another implementation, when the client computer is not authorized to receive the content at the requested resolution, a rendered message may be zoomed into in place of the content at the requested resolution. In this embodiment, the rendered message may indicate to the would-be purchaser that payment is required in order to view the content at the requested resolution. User interface controls may also be provided with the message through which an account may be created and payment information received for paying for the content at the requested resolution.

According to other implementations, when the client computer is not authorized to receive the content at the requested resolution, a user interface dialog box may be displayed at the client computer indicating that payment is required to view the content at the requested resolution. The dialog box may include user interface controls through which an account may be created and payment information received for paying for the content at the requested resolution.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 7A-7C are function diagrams illustrating aspects of several price functions utilized herein for computing the price of content at a specified resolution; and FIG. 8 is a computer architecture diagram showing a computer architecture suitable for implementing the various computer systems described herein.

DETAILED DESCRIPTION

Figure 1:
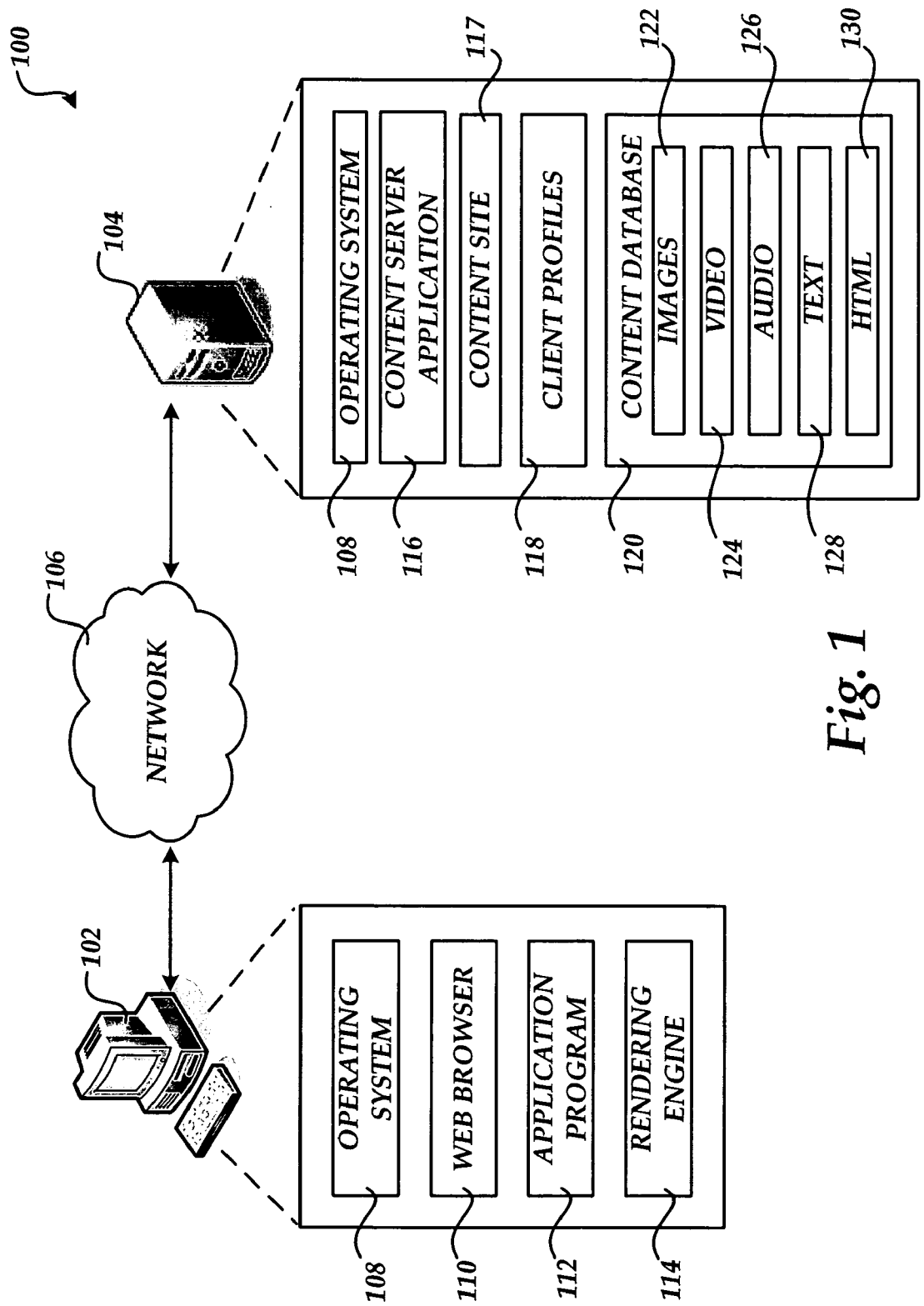
FIG. 1 is a network and software diagram showing an illustrative operating environment for the processes and computer systems described herein and several of the software components utilized by the computer systems described herein.

The following detailed description is directed to technologies for integrated content viewing and payment. As will be discussed in greater detail below, utilizing aspects presented herein a content purchaser can freely and fluidly zoom into and out of content at a continuous range of resolutions. Payment can be made automatically without interrupting the process of viewing the content. If payment cannot be made automatically, various user interfaces may be presented to the content purchaser that are integrated with the viewing process for allowing the purchaser to buy the content at any requested resolution.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for integrated content viewing and payment will be described. In particular, FIG. 1 is a network diagram illustrating aspects of a system 100 provided herein for viewing and paying for content that includes a client computer 102, a server computer 104, and a network 106, such as the Internet.

As shown in FIG. 1, the client computer 102 and the server computer 104 are communicatively coupled to one another through respective connections to the network 106. According to one implementation, the network 106 comprises the Internet. However, it should be appreciated that the network 106 may comprise a LAN, WAN, or other type of suitable network for connecting the client computer 102 and the server computer 104.

FIG. 1 also illustrates a number of software components utilized by the client computer 102 and the server computer 104. In particular, the client computer 102 includes an operating system 108 suitable for controlling the operation of a networked desktop or laptop computer. The server computer 104 includes an operating system 108 suitable for controlling the operation of a networked server computer. It should be appreciated that although the embodiments presented herein are described in the context of a desktop or laptop client computer 102 and a remote server computer 104, many other types of computing devices and systems may be utilized to embody the various aspects presented herein.

According to one implementation, the client computer 102 also includes a Web browser program (referred to herein as a "browser") 110. The browser 110 is operative to request, receive, and display information pages, such as Web pages, from the server computer 104. In particular, the browser 110 is operative to establish a connection with a content server application 116 executing on the server computer 104. Through the connection, the browser 110 may request pages of a content site 117 from the content server application 116. As described in greater detail herein, the content site 117 is a Web site or other type of information site through which a user may view and purchase content. The content server application 116 stores the content available through the content site 117 in a content database 120. The implementations described herein are discussed primarily in the context of the viewing and purchase of still images 122. It should be appreciated, however, that the implementations described herein apply equally to video 124, audio 126, text 128, hypertext markup language ("HTML") 130, and other types of content. Each of these content types may be stored in the content database 120 and provided to the Web browser 110 by the content server application 116.

According to implementations, the content server application 116 operates in conjunction with the Web browser 110 and a rendering engine 114 executing on the client computer 102 to provide the content in a manner that allows a user to freely and fluidly zoom into and out of the content at a continuous range of resolutions. This continuous, fluid zooming capability contrasts the discrete zooming capabilities of traditional application programs. In existing applications, the transition between different resolutions is not fluid in that the existing view is erased, followed by a rendering of the document at the requested resolution, resulting in a hesitation as the view transitions.

In contrast, the technology described in the disclosure presented herein utilizes adaptive rendering algorithms that allow for fluid and continuous transitions between resolutions by interpolating between stored resolutions to arrive at the requested resolution in a fluid, continuous manner. The amount of data transferred from the content server application 116 to the rendering engine 114 is proportional to the resolution of a display screen connected to the client computer 102 at which the content is rendered. This process is described in U.S. Pat. No. 7,075,535, filed Mar. 1, 2004 and entitled "System and Method for Exact Rendering in a Zooming User Interface," which is herein incorporated by reference in its entirety.

In the embodiments presented herein, the browser 110 is described as rendering the content site 117 with the assistance of the rendering engine 114. It should be appreciated, however, that the functionality provided by the rendering engine 114 for permitting fluid zooming into and out of content at a continuous range of resolutions may be integrated in the browser 110 or another application program 112. Alternatively, this functionality may be provided by the operating system 108 or other software components executing on the client computer 102. The embodiments described herein are not limited to the use of a Web browser 110 to view and render the content provided by the content server application 116.

In connection with the provision of the content site 117, the content server application 116 may maintain one or more client profiles 118 for users of the content site 117. Each client profile 118 contains account information for a user of the content site 117, such as name, address, and/or other contact information, and payment information, such as a credit card number. As will be described in greater detail below, this information may be utilized by the content server application 116 to charge an account for the provision of content at different resolutions without interrupting the viewing process. According to embodiments, payment data may also be stored in each client profile 118 identifying the content that has been previously paid for. By utilizing the payment data, the content server application 116 can avoid charging a purchaser twice for viewing the same content.

According to one implementation, the content server application 116 may also maintain data regarding how the content stored in the content database 120 should be priced. For instance, the content server application 116 may maintain data that identifies a price function to be utilized for each piece of content in the content database 120. A price function defines the price that should be charged for the content at a variety of resolutions.

The price function utilized by the content server application 116 may be a binary price function, a discrete price function, a continuous price function, or other type of price function. A binary price function provides the content for free up to a specified resolution and specifies a price for provision of the content at any resolution higher than the specified resolution. FIG. 7A shows one illustrative binary price function 700A. A discrete price function utilizes any number of discrete price levels for provision of the content. FIG. 7B shows one illustrative discrete price function 700B. A continuous price function varies the price of the content as a continuous function of resolution. In this case, the price function may be linear, logarithmic, exponential, or virtually any other type of continuous function. FIG. 7C shows one illustrative continuous price function 700C.

In another implementation, pricing may be deferred until after viewing has completed. In this implementation, the price function may calculate the price as a function of the total pixels viewed. According to other aspects provided herein, the server computer 104 may monitor current processor, memory, disk, and bandwidth loads. The server computer 104 can utilize this operational or computational cost data to vary the price of the content as a function of the various loads. Alternatively, this information may be utilized to provide improved service to certain classes of purchasers while reducing the service level provided to other classes of purchasers.

According to other implementations, the content server application 116 may also maintain data identifying which of a multitude of modes should be utilized to attempt to sell the content to the user when the user is not authorized to view content at a particular resolution. This may occur, for instance, when a user of the client computer 102 does not have an account with the content server application 116 or their account is not current. In one implementation, when the client computer 102 is not authorized to receive content at a requested resolution, the content may be provided to the client computer 102 at a resolution that is lower than the requested resolution. In the case of visual content, continued zooming into the provided content causes pixelation to indicate to the would-be purchaser that payment must be made in order to receive a higher resolution version of the image. This type of user interface is described below with respect to FIGS. 2C-2D.

In another implementation, when the client computer 102 is not authorized to receive the content at the requested resolution, a rendered message may be zoomed into in place of the content at the requested resolution. In this embodiment, the rendered message may indicate to the would-be purchaser that payment is required in order to view the content at the requested resolution. Such a user interface is described below with respect to FIGS. 2C and 2E. In another implementation, a user interface dialog box may be displayed at the client computer 102 indicating that payment is required to view the content at the requested resolution. The dialog box may include user interface controls through which an account may be created and payment information received for paying for the content at the requested resolution. An illustrative user interface of this type is described below with reference to FIGS. 2C and 2F.

Figure 2A:
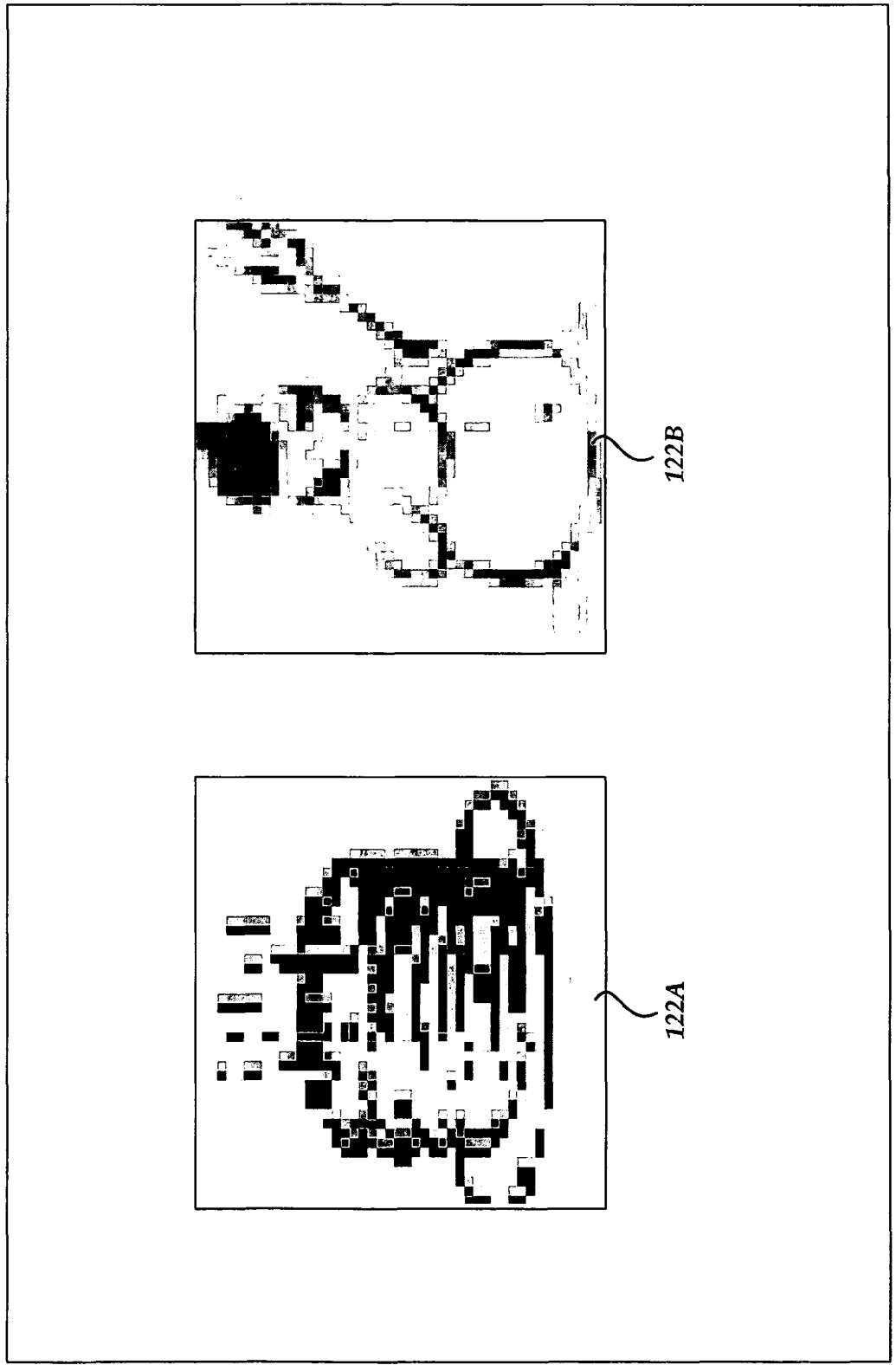
FIGS. 2A-2F are screen diagrams showing illustrative screen displays provided by the embodiments presented herein for integrating content viewing with a process for paying for the viewed content.
Figure 2B:
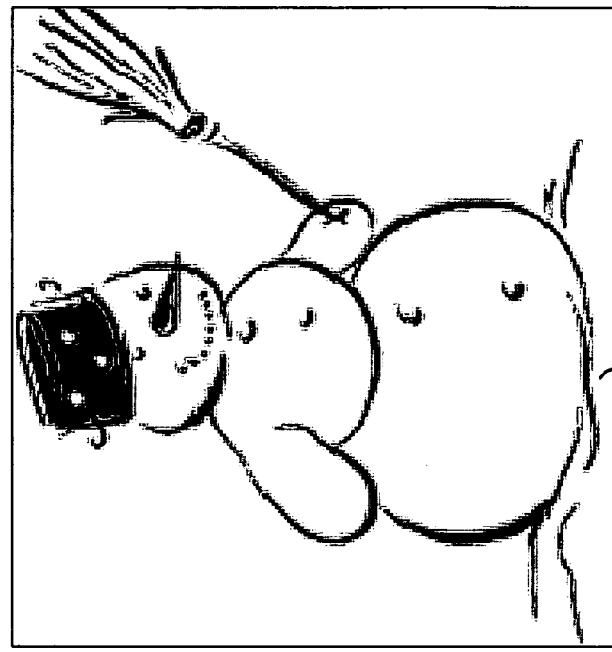
Figure 2B:
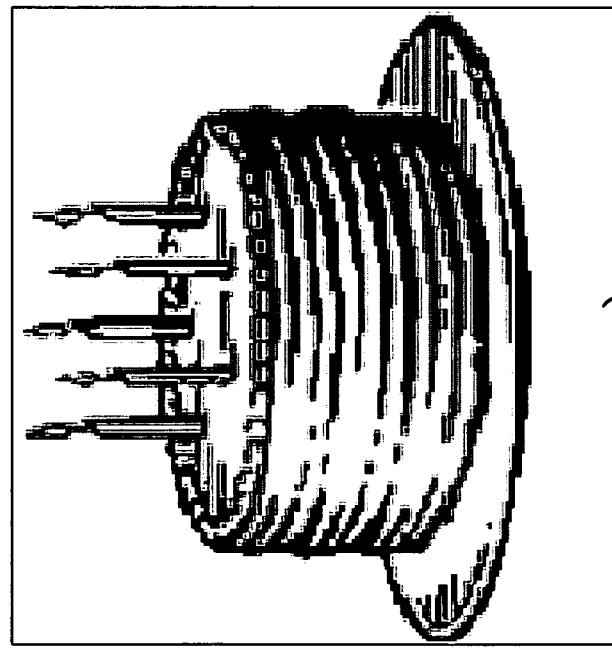
Figure 2C:
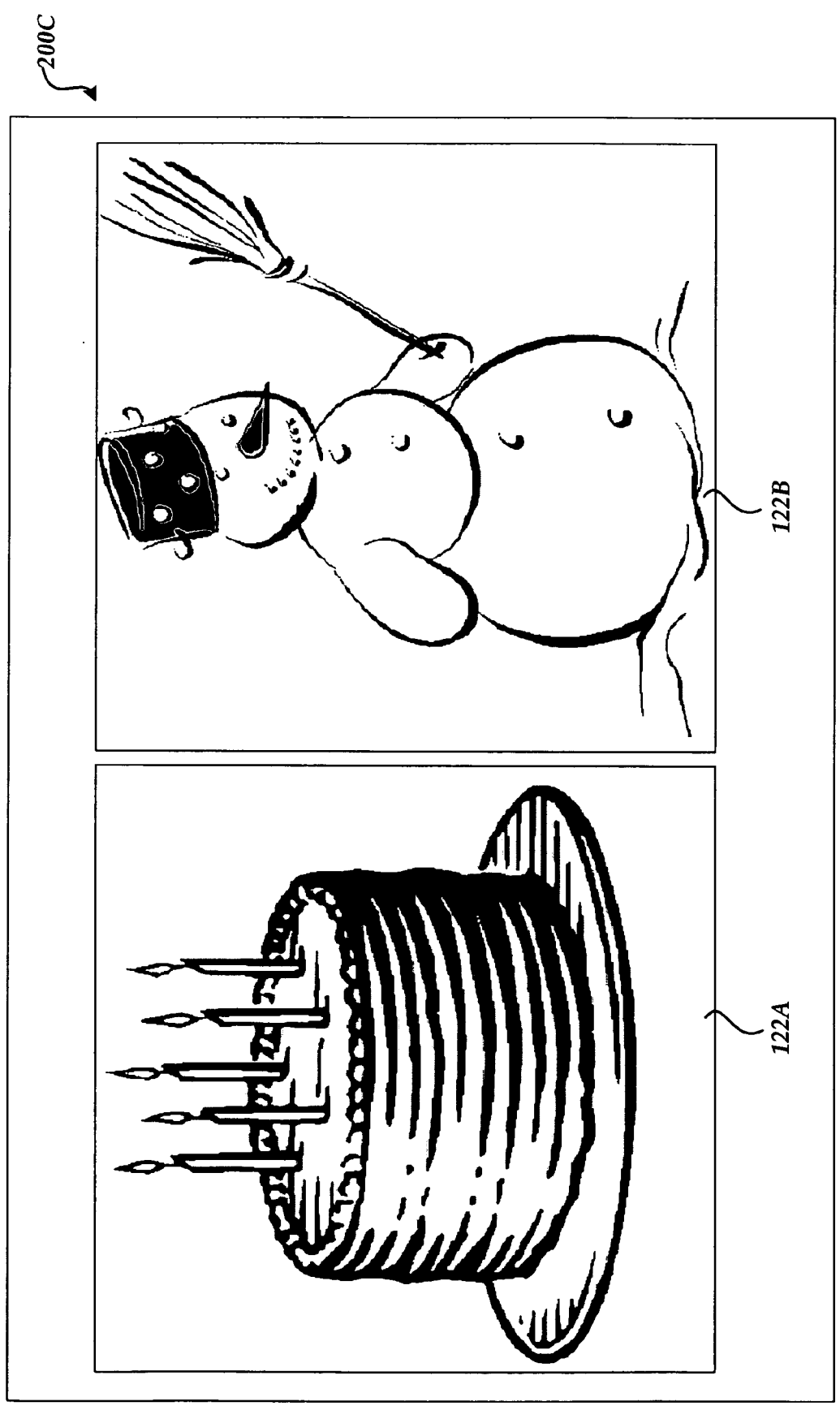

Referring now to FIGS. 2A-2C, aspects of an illustrative display 200A generated by the browser 110 operating in conjunction with the rendering engine 114 will be described. In particular, FIG. 2A shows a display 200A generated by the browser 110 for viewing content retrieved from the content site 117. In the example shown in FIG. 2A, two still images 122A and 122B provided by the content server application 116 are being displayed by the browser 110. The images 122A and 122B shown in FIG. 2A are low-resolution images and are therefore pixelated.

If a user of the client computer 102 desires to view the images 122A and 122B at a higher resolution than shown in FIG. 2A, the user may utilize a user input device connected to the client computer 102, such as a mouse or keyboard, to indicate to the browser 110 that the display 200A should be zoomed in. For instance, a user may utilize a scroll wheel on a mouse user input device to zoom the display. In response to such a request, the browser 110 transmits a request to the content server application 116 for higher resolution versions of the images 122A and 122B. If the client computer 102 is authorized to view the higher resolution versions, such as in the case where a user of the client computer 102 has an active account, then the higher resolution versions of the images 122A and 122B are transferred to the browser 110 and displayed. The display 200B shown in FIG. 2B shows the images 122A and 122B after the higher resolution versions have been displayed. It should be appreciated that although zooming between resolutions is shown in the FIGURES as being discrete, zooming between the various resolutions of the images occurs in a fluid continuous manner, as described above.

If the user of the client computer 102 desires even higher resolutions of the images 122A and 122B than those shown in FIG. 2B, the user may utilize the user input device to indicate to the browser 110 that the display 200B should be zoomed in. In response to such a request, the browser 110 transmits a request to the content server application 116 for higher resolution versions of the images 122A and 122B. If the client computer 102 is authorized to view the higher resolution versions, then the higher resolution versions of the images 122A and 122B are transferred to the browser 110 and displayed. The display 200C shown in FIG. 2C shows the images 122A and 122B after higher resolution versions have been displayed. It should be appreciated that zooming in the manner described herein allows a user to zoom between a continuous range of resolutions and that any number of resolutions may be zoomed into in this manner. It should also be appreciated that the user may zoom out of the content in a similar manner.

As discussed briefly above, if the client computer 102 is not authorized to receive the content at the requested resolution, the content server application 116 may utilize one of a multitude of up sell modes to sell the content at the desired resolution to the user of the client computer 102. As described herein, each of the up sell modes is integrated with the experience of viewing the content so as to minimize the intrusion on the viewing process. Various user interfaces provided in the up sell modes are described below with respect to FIGS. 2D-2F.

Figure 2D:
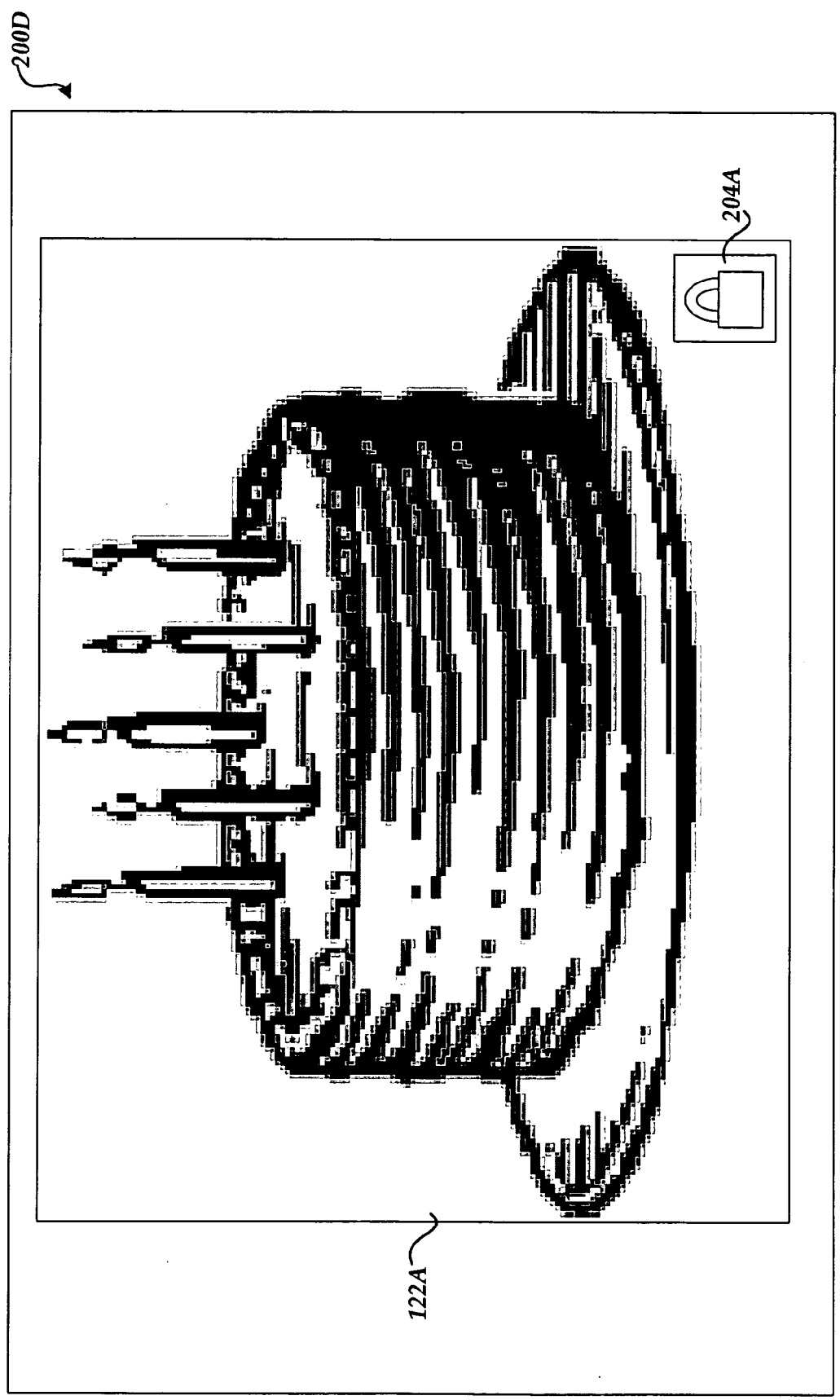

In one implementation, when the client computer 102 is not authorized to receive the content at the desired resolution, the content may be provided to the client computer 102 at a resolution that is lower than the requested resolution. In the case of a still image, continued zooming into the provided content causes pixelation, thereby indicating to the would-be purchaser that payment must be made in order to receive a higher resolution version of the image. This is illustrated in FIG. 2D, where a user has requested a higher resolution version of the image 122A. In this example, the image 122A is more pixelated than the image 122A shown in FIG. 2C due to the higher zoom level. This indicates to a user of the client computer 102 that a payment must be made to receive the image 122A at the desired resolution.

According to other aspects, a user interface control 204A, such as a selectable icon, may also be displayed adjacent to the pixelated content to indicate that payment must be made in order to receive the requested higher resolution version of the content. Selection of the user interface control 204A initiates a process whereby an account may be created and payment information received for the content. The account information is stored by the content server application 116 for use in future determinations regarding whether the client computer 102 is authorized to receive content at various resolutions.

Figure 2E:
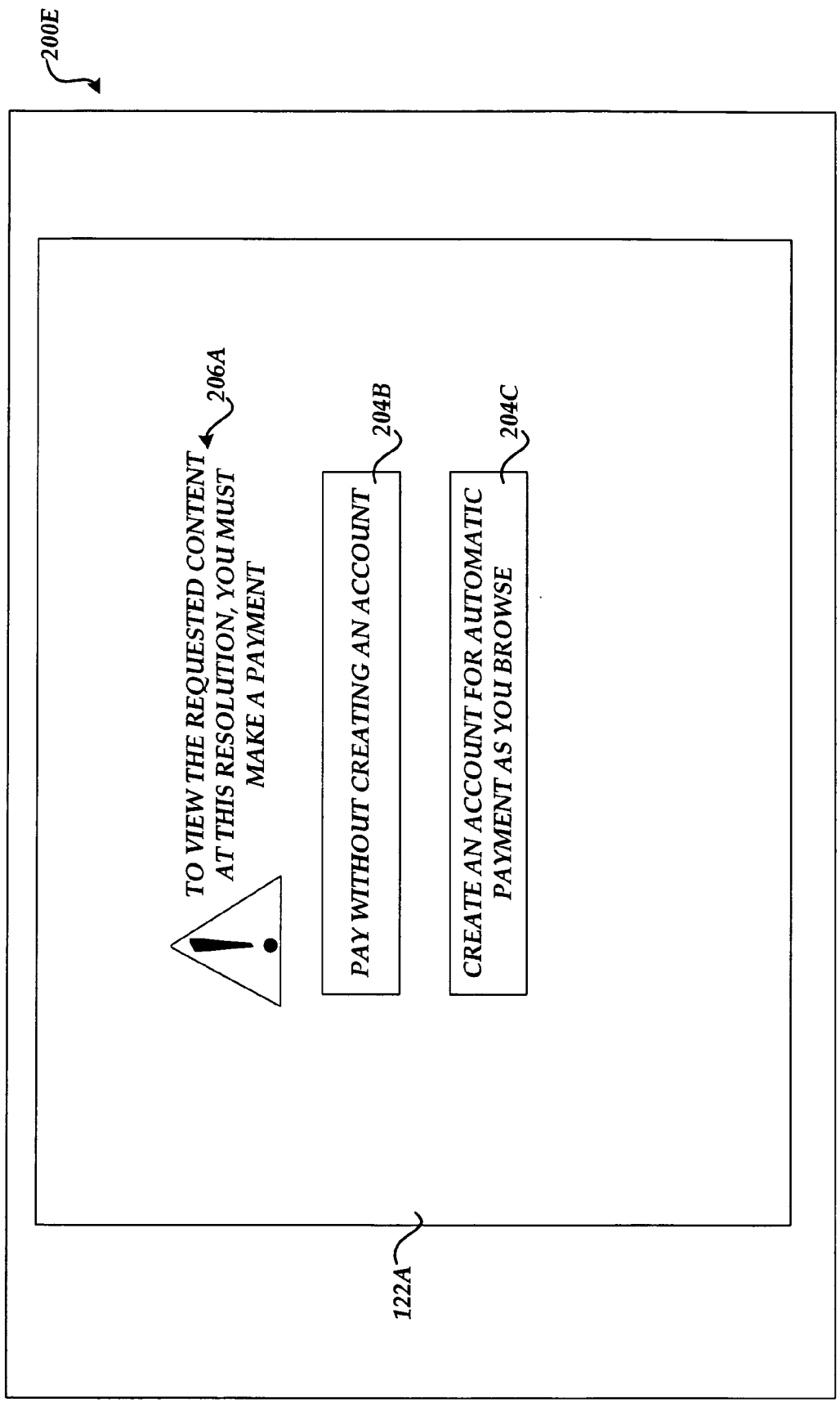

FIG. 2E illustrates aspects of another mode described herein for attempting to sell content to a user at a requested resolution that is integrated with the content viewing process. In this embodiment, the display 200E fluidly zooms into a rendered message in place of the image 122A at the requested resolution in response to determining that the client computer 102 is not authorized to view the content at the requested resolution. The rendering includes a message 206A that indicates to the would-be purchaser that payment is required in order to view the content at the desired resolution. In implementations, the user interface controls 204B and 204C may also be provided with the message 206A, through which an process may be invoked to create an account and specify payment information for paying for the content at the requested resolution. Once payment has been made, the content is displayed at the desired resolution. By zooming into a rendered payment message and user interface when a payment is required, payment for the content is tightly integrated with the process of viewing the content at a continuous range of resolutions.

Figure 2F:
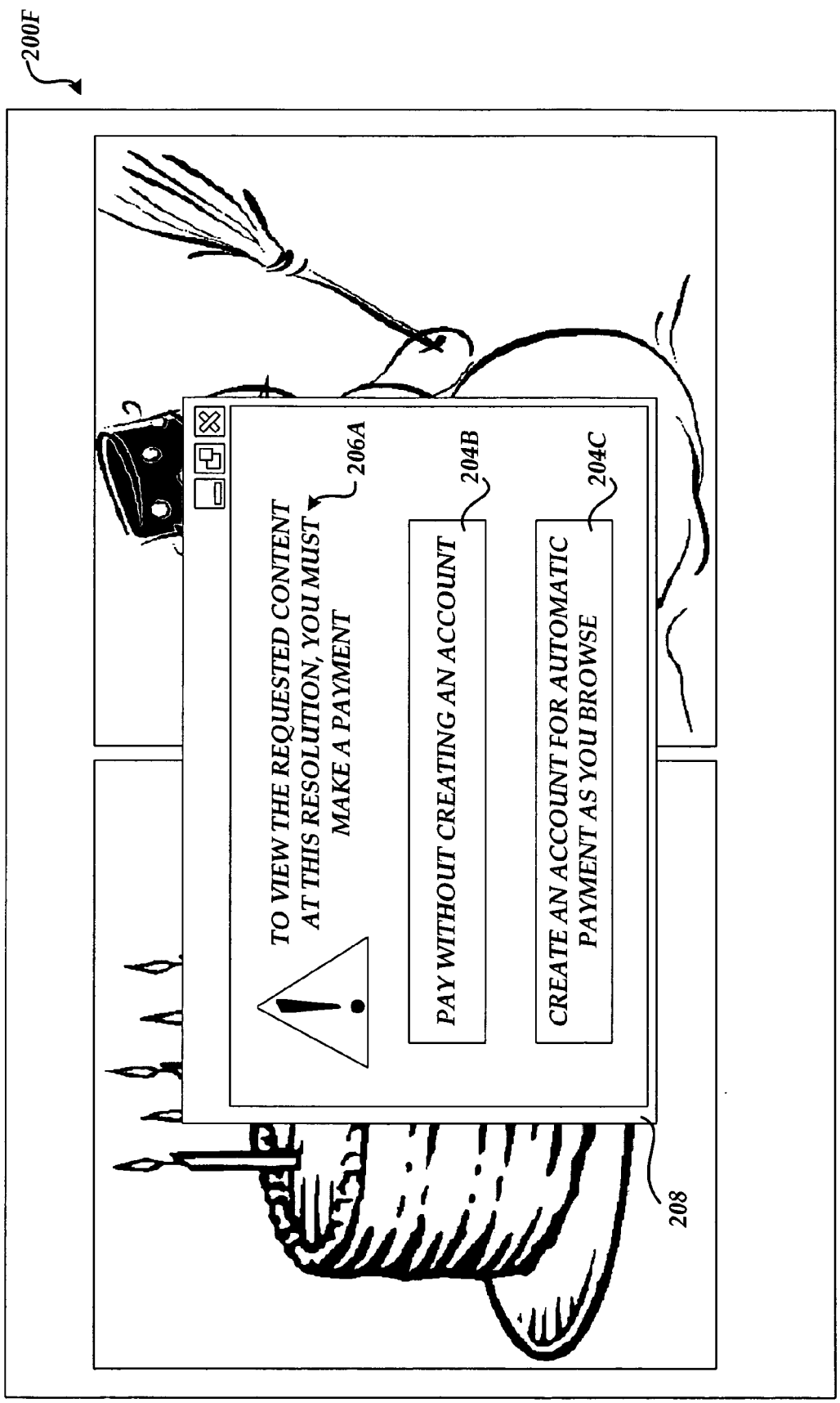

FIG. 2F illustrates aspects of another up sell mode provided herein that is integrated with the content viewing process. In this embodiment, a user interface dialog box 208 is shown within the display 200F in response to determining that the client computer 102 is not authorized to view the content at the requested resolution. The user interface dialog box 208 includes text or graphics indicating that payment is required to view the content at the requested resolution. The user interface dialog box 208 may further include the user interface controls 204B and 204C through which an process may be initiated to create an account and specify payment information for paying for the content at the requested resolution. Once payment has been made, the user interface dialog box 208 is removed and the content is shown in the display 200F at the desired resolution.

Figure 3:
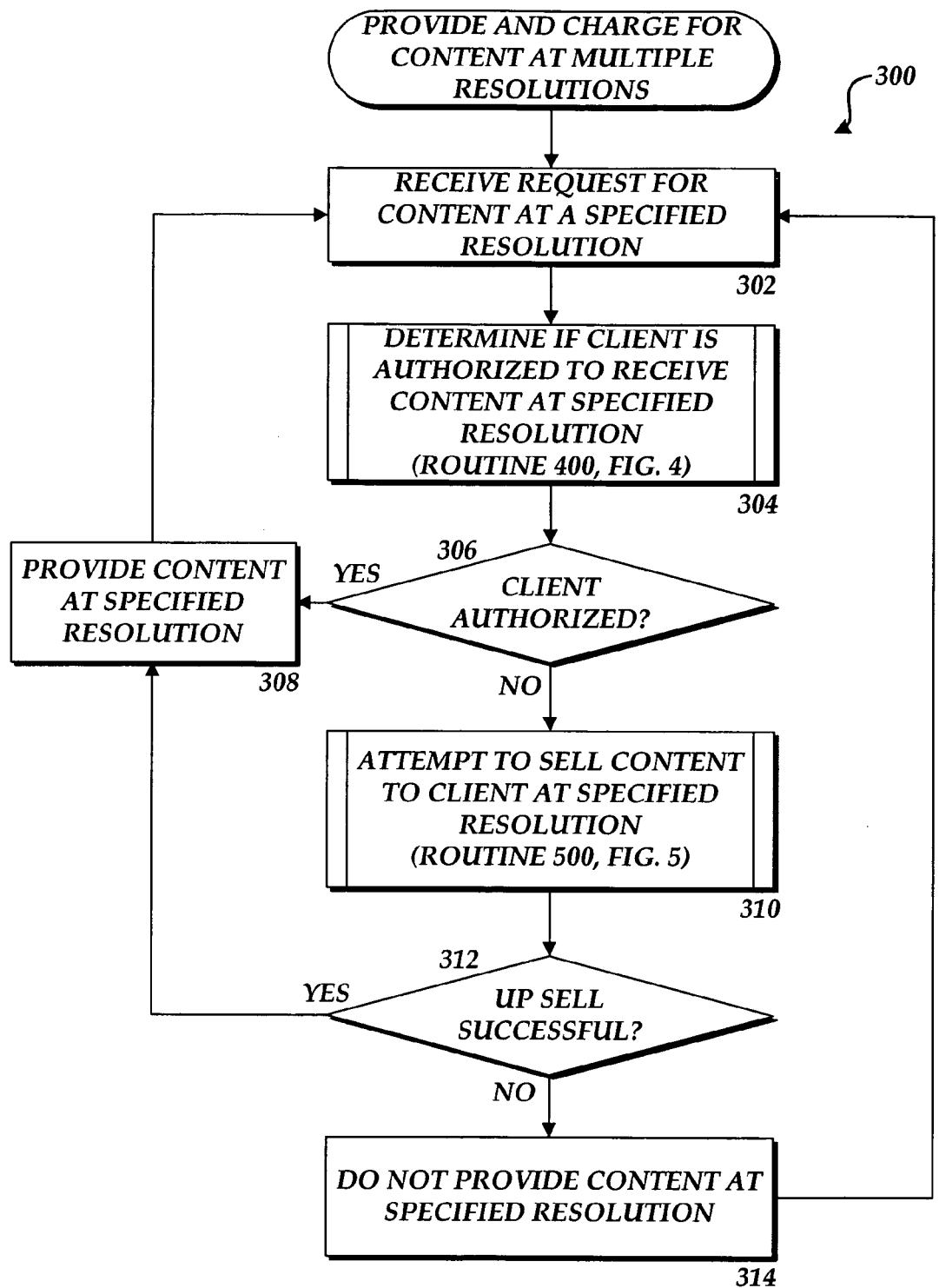
FIGS. 3-6 are flow diagrams illustrating various processes provided herein for integrating content viewing and payment according to one implementation.

Referring now to FIG. 3, additional details will be provided regarding the embodiments presented herein for integrated content viewing and payment. In particular, FIG. 3 is a flow diagram showing a routine 300 that illustrates the operation of the server computer 104 for permitting the viewing of content at a continuous range of resolutions and charging for the content according to one implementation. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should be appreciated that while a specific number of operations are shown in FIGS. 3-6, a greater or fewer number of operations may be carried out and the operations may be carried out in other orders.

Figure 4:
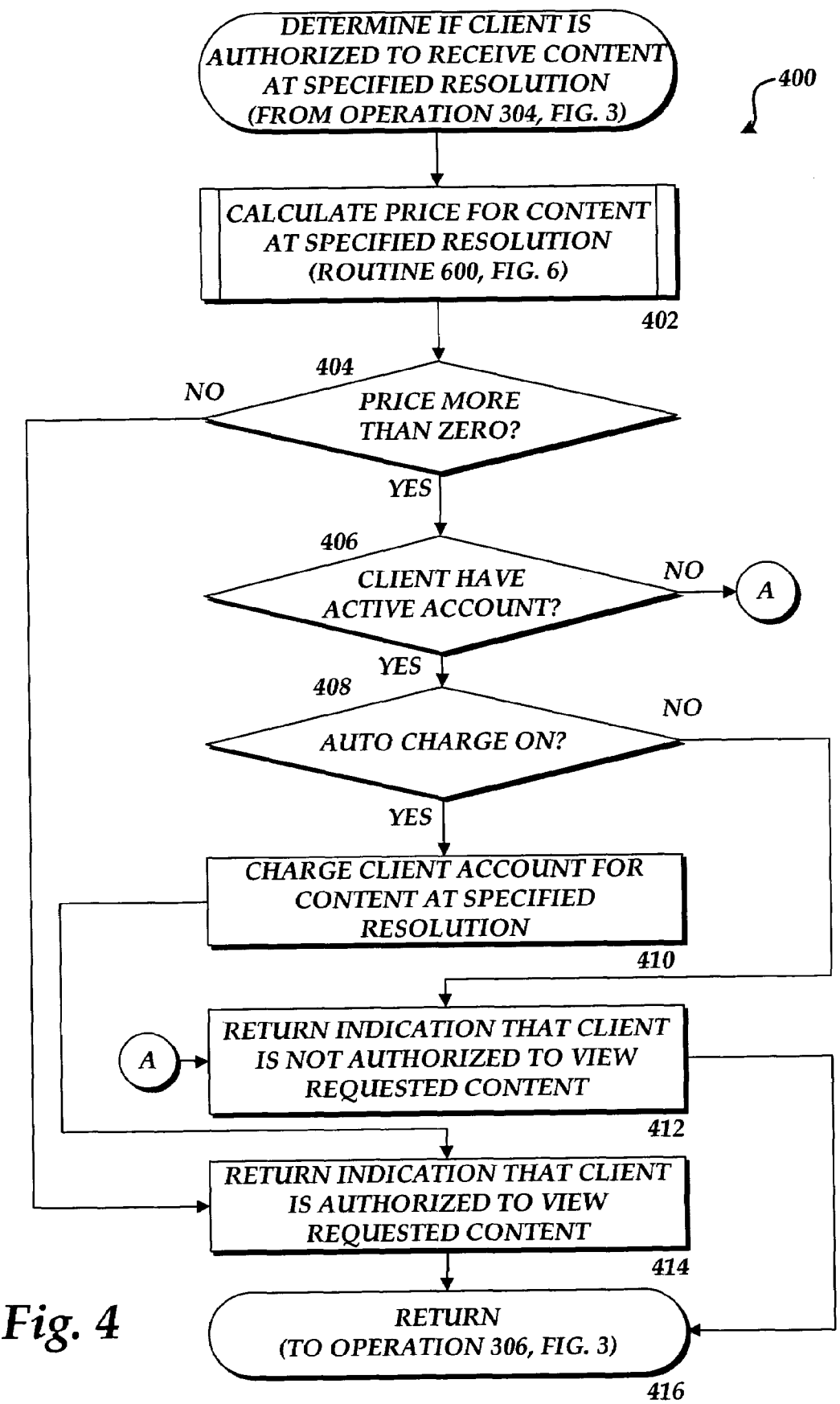

The routine 300 begins at operation 302, where the server computer 104 receives a request for content at a specified resolution from the client computer 102. In response to receiving the request, the routine 300 continues to operation 304, where the server computer 104 determines if the client computer 102 is authorized to receive the requested content at the specified resolution. The routine 400, described below with respect to FIG. 4, shows an illustrative method for determining whether the client computer 102 is authorized to receive content at a requested resolution. From operation 304, the routine 300 continues to operation 306.

If the client computer 102 is authorized to receive the requested content at the desired resolution, the routine 300 proceeds from operation 306 to operation 308. At operation 308, the requested content is provided to the client computer 102 at the requested resolution. As described herein, the software components executing on the client computer 102 and the server computer 104 allow the client computer 102 to fluidly zoom into the provided content. The routine 300 then continues from operation 308 to operation 302, described above, where additional requests for content are processed. If, however, the client computer 102 is not authorized to receive the requested content, the routine 300 continues from operation 304 to operation 310.

At operation 310, one of several up sell modes is utilized in an attempt to sell the requested content at the desired resolution to a user of the client computer 102. An illustrative routine 500 will be described below with respect to FIG. 5 for performing the up sell. If the up sell is successful and the user agrees to purchase the content at the desired resolution, the routine 300 continues from operation 312 to operation 308, described above. If the up sell is unsuccessful, the requested content is not provided to the client computer 102. The routine 300 then returns from operation 314 to operation 302, described above.

Referring now to FIG. 4, an illustrative routine 400 will be described for determining whether a client computer 102 is authorized to receive content at a requested resolution. The routine 400 begins at operation 402 where a price is calculated for the content at the requested resolution. An illustrative routine 600 will be described below with reference to FIG. 6 for calculating the price of the content at the requested resolution. Once the price has been computed, the routine 400 continues from operation 402 to operation 404 where a determination is made as to whether the price is greater than zero. If the price is not greater than zero, the content may be viewed without payment. Accordingly, if the price is not greater than zero, the routine 400 proceeds from operation 404 to operation 414. At operation 414 an indication is returned indicating that the client computer 102 is authorized to view the content at the requested resolution. If the price is greater than zero, the routine continues from operation 404 to operation 406.

At operation 406, the content server application 116 determines whether the user operating the client computer 102 has an active account. As described above, information regarding the account status for various users may be stored in the client profiles 118. If the user of the client computer 102 does not have an active account, the routine 400 proceeds from operation 406 to operation 412, described below. If the user of the client computer 102 does have an active account, the routine 400 continues from operation 406 to operation 408.

At operation 408, the content server application 116 determines whether the client profile 118 associated with the user of the client computer 102 indicates that the user's account should be automatically charged for viewed content without interrupting the viewing process. If a charge can be made automatically in this manner, the routine 400 continues from operation 408 to operation 410. At operation 410, the account associated with the user of the client computer 102 is charged for the provision of the content at the requested resolution. If the user's account specifies that it should not be automatically charged for viewed content, the routine 400 proceeds from operation 408 to operation 412. At operation 412, an indication is returned that the client computer 102 is not authorized to view the content at the requested resolution. From operations 412 and 414, the routine 400 continues to operation 416 where it returns to the operation 306, described above with reference to FIG. 3.

Figure 5:
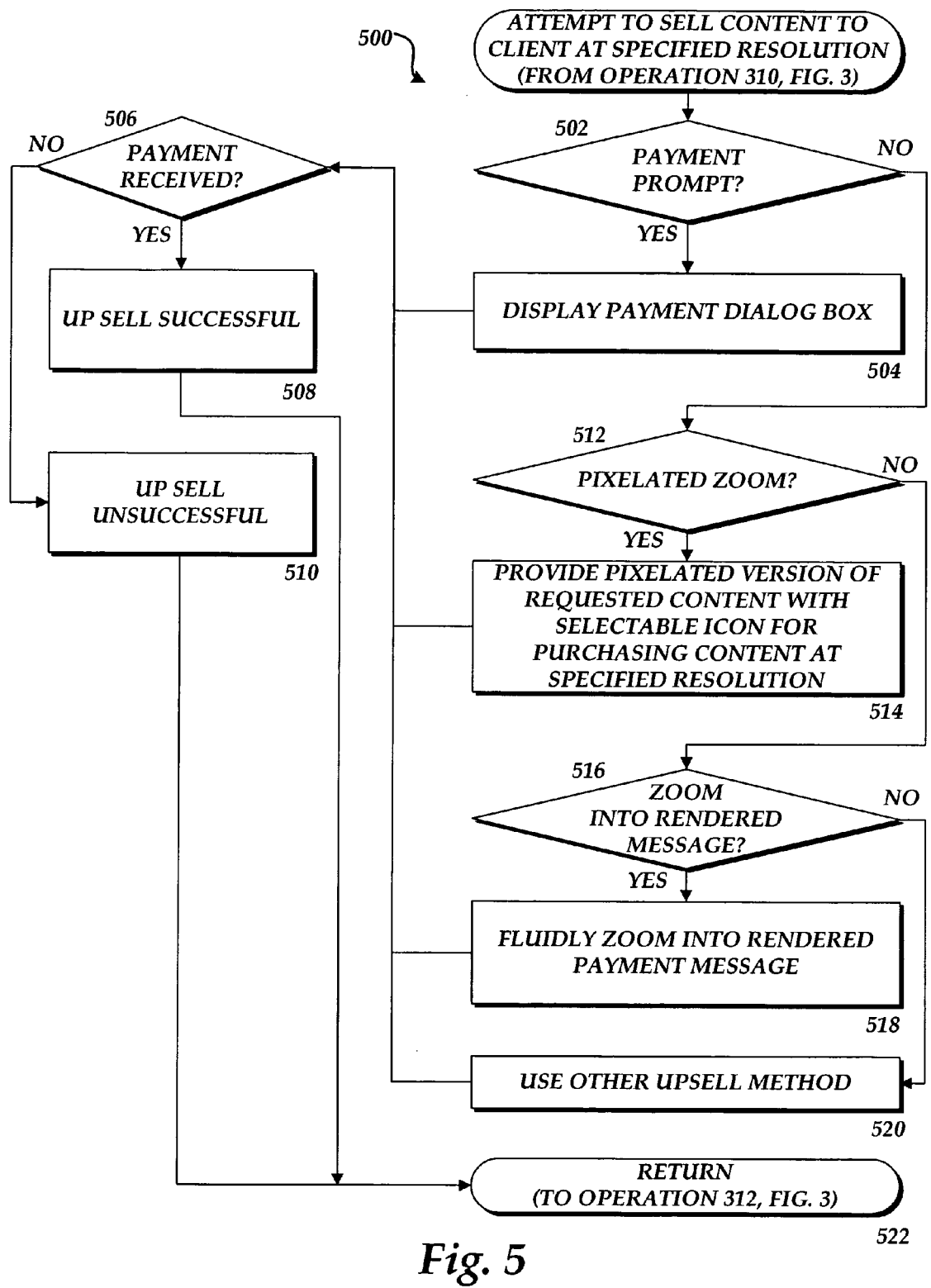

Turning now to FIG. 5, an illustrative routine 500 will be described for up selling a user of the client computer content at a requested resolution. As discussed above, the content server application 116 may maintain a setting indicating the type of up sell mode that should be utilized for each item of content stored in the content database 120. Alternatively, the setting may be specified as a global default for all content available through the content site 117, as a user preference, or in another manner.

The routine 500 begins at operation 502, where a determination is made as to whether the dialog box 208, shown in FIG. 2F and described above, should be utilized in an attempt to sell the content to the user of the client computer 102. If so, the routine 500 continues to operation 504, where the dialog box 208 is displayed at the client computer 102 and utilized in the manner described above. The routine 500 then continues from operation 504 to operation 506, described below.

If the dialog box 208 is not to be utilized in the up sell, the routine 500 continues from operation 502 to operation 512. At operation 512, a determination is made as to whether the pixelated zoom process, shown in FIGS. 2D and 2E and described above, should be utilized to up sell the content at the requested resolution to the user of the client computer. If so, the routine 500 continues from operation 512 to operation 514, where the requested content is displayed in the pixelated fashion shown in FIG. 2E along with a user interface control 204A that may be selected to purchase the content at the requested resolution. From operation 514, the routine 500 continues to operation 506, described below. If the pixelated zoom process is not to be utilized to up sell the content, the routine 500 proceeds from operation 512 to operation 516.

At operation 516, a determination is made as to whether the browser 110 should be zoomed into a rendered message 206A in the manner described above with respect to FIG. 2E. If so, the routine 500 continues to operation 518, where the browser 110 zooms into the message in the manner described above with respect to FIG. 2E. Payment information may then be received from the user utilizing the user interface controls 204B and 204C. The routine 500 then continues from operation 518 to operation 506, described below. If this up sell mode is not to be utilized, the routine 500 proceeds from operation 516 to operation 520, where another up sell mode may be utilized. From operation 520, the routine 500 continues to operation 506, described below.

At operation 506, the content server application 116 determines whether payment has been received for the content at the requested resolution. If so, the routine 500 continues from operation 506 to operation 508 where an indication is returned that the up sell was successful. If payment is not received, however, an indication is returned that the up sell was unsuccessful at operation 510. From operations 508 and 510, the routine 500 returns to operation 312 described above with reference to FIG. 3.

Figure 6:
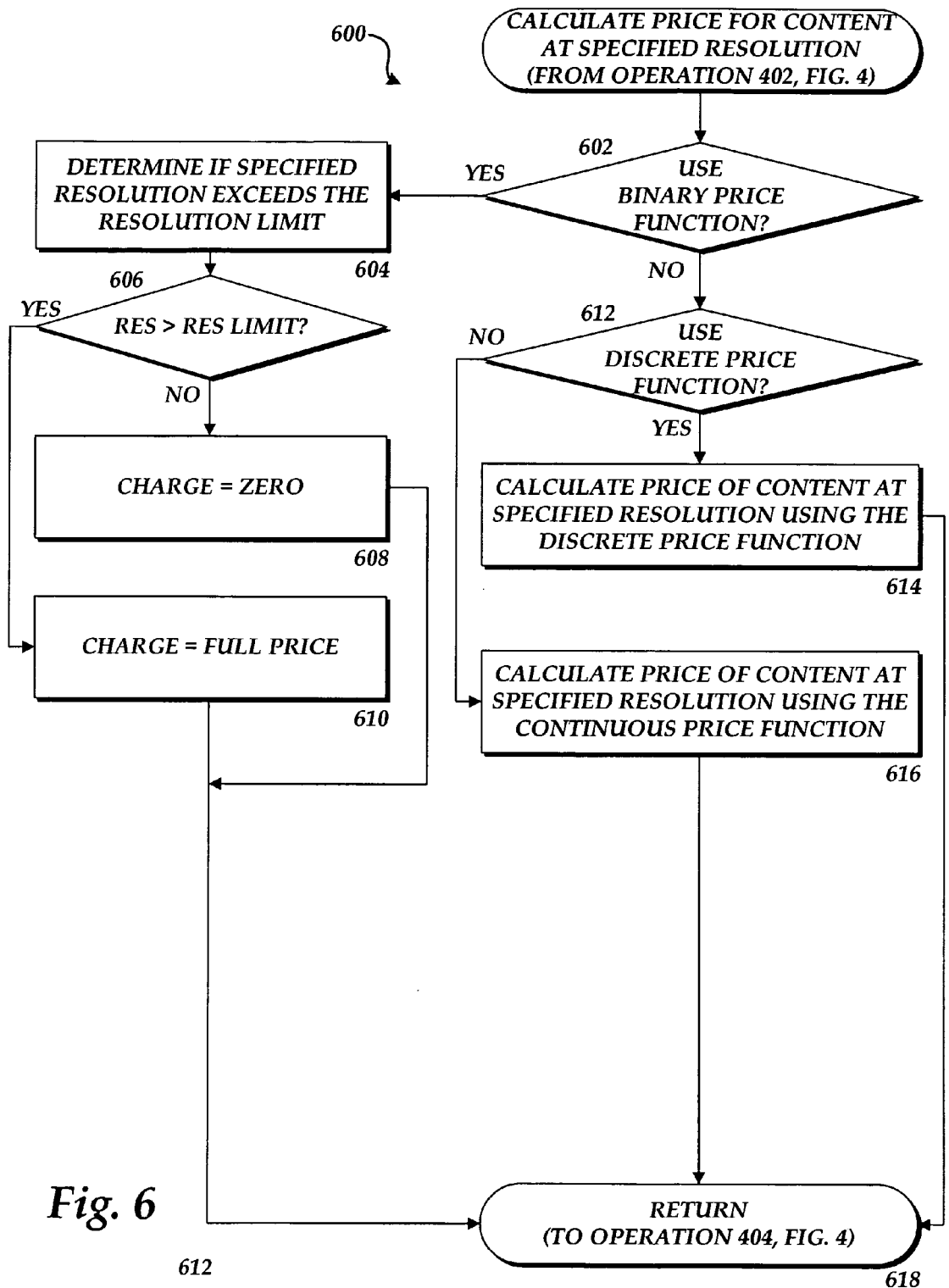

Referring now to FIG. 6, an illustrative routine 600 will be described for calculating the price for content at a specified resolution. As discussed above, the content server application 116 may maintain data identifying a price function that should be utilized for each item of content in the content database 120. The routine 600 illustrates how a price is calculated utilizing each of the available price functions. The routine 600 begins at operation 602 where a determination is made as to whether a binary price function should be utilized to calculate the price of the content. If so, the routine 600 proceeds from operation 602 to operation 604.

At operation 604, a determination is made as to whether the requested resolution exceeds a resolution limit. The resolution limit is the resolution at which a charge must be made for provision of the content. Content at any resolution lower than the resolution limit is provided without a charge. If the requested resolution is greater than the resolution limit, the routine 600 proceeds from operation 606 to operation 610, where the price for the content is set at a full price. If the requested resolution does not exceed the resolution limit, the routine 600 continues from operation 606 to operation 608, where the price is set to zero. In this manner, a full price may be charged for content provided at a resolution that exceeds the resolution limit, while content is provided for free at lower resolutions. From operation 608 and 610, the routine 600 continues to operation 618 where it returns to operation 404, described above with reference to FIG. 4.

If, at operation 602, it is determined that a binary price function should not be utilized, the routine 600 continues from operation 602 to operation 612. At operation 612, a determination is made as to whether a discrete price function should be utilized. As described above, a discrete price function utilizes any number of discrete price levels for the content. If a discrete price function is to be utilized, the routine 600 continues from operation 612 to operation 614, where the price of the content at the requested resolution is calculated utilizing the discrete price function. From operation 614, the routine 600 continues to operation 618.

If, at operation 612, it is determined that a discrete price function should not be utilized, the routine 600 branches from operation 612 to operation 616. At operation 616, the price of the content at the requested resolution is calculated utilizing a continuous price function. As described above, a continuous price function is a function that varies the price of the content as a continuous function of resolution. The price function may be linear, logarithmic, exponential, or virtually any other type of continuous function. From operation 616, the routine 600 continues to operation 618 where it returns to operation 404, described above with reference to FIG. 4.

Referring now to FIG. 8, an illustrative computer architecture for a computer 800 utilized in the various embodiments presented herein will be discussed. The computer architecture shown in FIG. 8 illustrates a conventional desktop, laptop computer, or server computer. It should be appreciated that the computer 800 could take other forms rather than a traditional desktop, laptop, or server computer. For instance, the computer 800 may comprise a mobile telephone or other type of hand-held computing device.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 108, application programs, and other program modules, which will be described in greater detail below.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800.

According to various embodiments, the computer 800 may operate in a networked environment using logical connections to remote computers through a network 106, such as the Internet. The computer 800 may connect to the network 106 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 108 suitable for controlling the operation of a networked desktop or server computer. The mass storage device 810 and RAM 814 may also store one or more program modules. In particular, the mass storage device 810 and the RAM 814 may store a Web browser 110, a content server application 116, and the other program modules described above with respect to FIG. 1. Other program modules may also be stored in the mass storage device 810 and utilized by the computer 800.

Based on the foregoing, it should be appreciated that systems, methods, and computer-readable media for integrated content viewing and payment are provided herein. The implementations described herein are discussed primarily in the context of the viewing and purchase of still images. It should be appreciated, however, that the implementations described herein apply equally to video, audio, text, HTML, and other types of content. In the case of audio, the term resolution as used herein refers to the sampling rate of the audio. Zooming into and out of audio may also comprise playing audio samples at higher or lower sampling rates, respectively. In the case of movies, zooming may comprise increasing or decreasing the pixel resolution of each frame of a movie. Alternatively, zooming may comprise increasing or decreasing the number of frames in a given unit of time for the movie. For instance, a low-resolution movie may include only five frames per second, while a high-resolution version may include a hundred or more frames per second.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for integrating content viewing with payment for viewed content, the method comprising:
   offering content for viewing at a continuous range of resolutions, the continuous range of resolutions having been created utilizing adaptive rendering algorithms that allow for fluid and continuous transitions between resolutions by interpolating between stored resolutions to arrive at a desired resolution in a fluid, continuous manner;
   receiving a request to view the content at the desired resolution of the continuous range of resolutions;
   receiving a price function associated with the content, the price function adapted to associate the continuous range of resolutions to different prices of the content;
   calculating, based on the price function, a price for the content at the desired resolution;
   providing the content for viewing at the desired resolution; and
   charging the price for the content at the desired resolution while the content is being viewed.

2. The method of claim 1, wherein the request to view the content is received from a client computer, and wherein the method further comprises prior to providing the content for viewing at the desired resolution:
   determining whether the client computer is authorized to receive the content at the desired resolution; and
   in response to determining that the client computer is authorized to receive the content at the desired resolution, providing the content for viewing at the desired resolution and charging the price for the content at the desired resolution while the content is being viewed.

3. The method of claim 2, further comprising providing the content for viewing at a resolution lower than the desired resolution in response to determining that the client computer is not authorized to receive the content at the desired resolution.

4. The method of claim 2, further comprising:
   in response to determining that the client computer is not authorized to receive the content at the desired resolution, providing a rendered message in place of the content at the desired resolution, the rendered message indicating that payment is required to view the content at the desired resolution and including one or more user interface controls for paying for the content at the desired resolution.

5. The method of claim 2, further comprising:
   in response to determining that the client computer is not authorized to receive the content at the desired resolution, causing a user interface dialog box to be displayed that indicates that payment is required to view the content at the desired resolution and that includes one or more user interface controls for paying for the content at the desired resolution.

6. The method of claim 2, wherein calculating a price for the content at the desired resolution comprises calculating a price for the content at the desired resolution using a binary price function.

7. The method of claim 2, wherein calculating a price for the content at the desired resolution comprises calculating a price for the content at the desired resolution using a discrete price function.

8. The method of claim 2, wherein calculating a price for the content at the desired resolution comprises calculating a price for the content at the desired resolution using a continuous price function.

9. A computer-readable storage medium that is not a signal having computer-executable instructions stored thereon which, when executed by a computer, cause the computer to:
   expose content at a continuous range of resolutions to a client computer, the continuous range of resolutions having been created utilizing adaptive rendering algorithms that allow for fluid and continuous transitions between resolutions by interpolating between stored resolutions to arrive at a desired resolution in a fluid, continuous manner;
   receive a request for the content at the desired resolution of the continuous range of resolutions from the client computer;
   receive a price function associated with the content, the price function adapted to associate the continuous range of resolutions to different prices of the content;
   compute, based on the price function, a price for the content at the desired resolution using a price function;
   determine whether the client computer is authorized to receive the content at the desired resolution; and
   in response to determining that the client computer is authorized to receive the content at the desired resolution, provide the content to the client computer at the desired resolution and charge the price for the content.

10. The computer-readable storage medium of claim 9 having further computer-executable instructions stored thereon which, when executed by the computer, cause the computer to provide the content to the client computer at a resolution lower than the desired resolution in response to determining that the client computer is not authorized to receive the content at the desired resolution.

11. The computer-readable storage medium of claim 9 having further computer-executable instructions stored thereon which, when executed by the computer, cause the computer to:
   in response to determining that the client computer is not authorized to receive the content at the desired resolution, to provide a rendered message to the client computer in place of the content at the desired resolution, the rendered message indicating that payment is required to view the content at the desired resolution and including one or more user interface controls for paying for the content at the desired resolution.

12. The computer-readable storage medium of claim 9 having further computer-executable instructions stored thereon which, when executed by the computer, cause the computer to:
   in response to determining that the client computer is not authorized to receive the content at the desired resolution, to cause a user interface dialog box to be displayed at the client computer, the user interface dialog box indicating that payment is required to view the content at the desired resolution and including one or more user interface controls for paying for the content at the desired resolution.

13. The computer-readable storage medium of claim 9, wherein the price function comprises a binary price function.

14. The computer-readable storage medium of claim 9, wherein the price function comprises a discrete price function.

15. The computer-readable storage medium of claim 9, wherein the price function comprises a continuous price function.

16. A method for integrating content viewing with payment for viewed content, the method comprising:

exposing content at a continuous range of resolutions for viewing at a client computer, the continuous range of resolutions having been created utilizing adaptive rendering algorithms that allow for fluid and continuous transitions between resolutions by interpolating between stored resolutions to arrive at a desired resolution in a fluid, continuous manner, the continuous range of resolutions between a low resolution and a high resolution;

receiving a request to view the content at the desired resolution within the continuous range of resolutions between the low resolution and the high resolution;

determining whether an account exists that can be charged for the content at the desired resolution while the content is being viewed; and in response to determining that an account exists that can be charged for the content at the desired resolution, responding to the request with the content at the desired resolution and charging the account for the content at the desired resolution without interrupting viewing of the content at the client computer by receiving a price function associated with the content, the price function adapted to associate the continuous range of resolutions to different prices of the content computing, based on the price function, a price for the content at the desired resolution using a price function that defines the price as a function of the desired resolution and charging the price to the account.

17. The method of claim 16, further comprising:
in response to determining that an account does not exist that can be charged for the desired resolution, providing the content to the client computer at a resolution lower than the desired resolution and causing a user interface control to be displayed at the client computer which, when selected, will cause a user interface to be displayed at the client computer through which payment may be made for the content at the desired resolution.

18. The method of claim 16, further comprising:
in response to determining that an account does not exist that can be charged for the content, providing a rendered message to the client computer in place of the content at the desired resolution, the rendered message indicating that payment is required to view the content at the desired resolution and including one or more user interface controls through which payment may be made for the content at the desired resolution.

19. The method of claim 16, further comprising:
in response to determining that an account does not exist that can be charged for provision of the desired resolution, causing a user interface dialog box to be displayed at the client computer, the user interface dialog box including a message indicating that payment is required to view the content at the desired resolution and further including one or more user interface controls through which payment may be made for the content at the desired resolution.

20. The method of claim 16, wherein the price function comprises one of a binary price function, a discrete price function, or a continuous price function.

* * * * *